(12) United States Patent
Tian et al.

(10) Patent No.: US 9,423,251 B2
(45) Date of Patent: Aug. 23, 2016

(54) TYPE OF ALONG-THE-CABLE RECIPROCATING MOTION CONTROL MECHANISM

(71) Applicant: Ocean University of China, Qingdao, Shandong (CN)

(72) Inventors: Jiwei Tian, Shandong (CN); Wei Zhao, Shandong (CN); Ming Xu, Shandong (CN); Qingxuan Yang, Shandong (CN)

(73) Assignee: OCEAN UNIVERSITY OF CHINA, Qingdao, Shandong (CN)

( * ) Notice: Subject to any disclaimer, the term of this patent is extended or adjusted under 35 U.S.C. 154(b) by 0 days.

(21) Appl. No.: 14/851,871

(22) Filed: Sep. 11, 2015

(65) Prior Publication Data

US 2016/0187132 A1    Jun. 30, 2016

(30) Foreign Application Priority Data

Dec. 25, 2014    (CN) .......................... 2014 1 0820855

(51) Int. Cl.
*G01C 13/00* (2006.01)

(52) U.S. Cl.
CPC .............. *G01C 13/004* (2013.01); *G01C 13/00* (2013.01)

(58) Field of Classification Search
None
See application file for complete search history.

(56) References Cited

U.S. PATENT DOCUMENTS

| | | | | |
|---|---|---|---|---|
| 3,841,106 A * | 10/1974 | Blumberg | ................. | F16L 1/20 405/172 |
| 4,659,253 A * | 4/1987 | Jacobson | ................. | H02G 1/10 45/158 |
| 4,924,698 A * | 5/1990 | Echert | ..................... | B63B 22/18 441/33 |
| 5,069,580 A * | 12/1991 | Herwig | ................... | B63C 11/34 405/188 |
| 8,297,361 B1 * | 10/2012 | Root | ................... | E21B 43/0122 166/341 |
| 8,875,645 B1 * | 11/2014 | Webb | ..................... | G01C 13/00 114/312 |
| 2010/0213718 A1 * | 8/2010 | Kelly | ........................ | F03D 5/04 290/55 |
| 2012/0247782 A1 * | 10/2012 | Smith | ................... | E21B 17/012 166/350 |
| 2014/0017010 A1 * | 1/2014 | Jones | .................. | E21B 43/0122 405/60 |
| 2014/0348593 A1 | 11/2014 | Kawahara et al. | | |
| 2015/0053413 A1 * | 2/2015 | Collins | .................. | B63G 8/001 166/350 |
| 2015/0354956 A1 * | 12/2015 | Tian | ....................... | G01C 13/00 73/170.29 |
| 2015/0354957 A1 * | 12/2015 | Tian | ....................... | G01C 13/00 73/170.29 |

FOREIGN PATENT DOCUMENTS

| | | |
|---|---|---|
| CN | 1307497 C | 3/2007 |
| CN | 101327838 B | 9/2010 |
| CN | 103448891 A | 12/2013 |
| CN | 103591941 A | 2/2014 |
| CN | 204021231 U | 12/2014 |
| JP | 3117566 U | 12/2005 |
| WO | 2013039048 A1 | 3/2013 |

* cited by examiner

*Primary Examiner* — Andre Allen
(74) *Attorney, Agent, or Firm* — Buchanan Ingersoll & Rooney PC

(57) ABSTRACT

An along-the-cable reciprocating motion control mechanism includes a moving platform, weight drop-off gear, weight release gear and trigger gear. The moving platform is set at a guide cable and can make reciprocating motion along the guide cable. A profiler is carried by the moving platform and the buoyancy of the moving platform carrying the profiler is greater than zero, the weight drop-off gear is set at the top of the guide cable and can drop a weight onto the moving platform within a predefined period, the weight release gear is provided on the moving platform, the trigger gear is set at the bottom of the guide cable, and when the moving platform carries a weight and descends to the bottom of the guide cable, the trigger gear touches the weight release gear to enable it to make a series of actions.

9 Claims, 14 Drawing Sheets

TYPE OF ALONG-THE-CABLE RECIPROCATING MOTION CONTROL MECHANISM

TECHNICAL FIELD

The present invention relates to the field of the marine environment monitoring technologies and more specifically to a type of along-the-cable reciprocating motion control mechanism.

BACKGROUND

Presently, instruments for along-the-cable underwater profile measurement are basically categorized into two types:

The first type is an instrument that adopts an oil sac for buoyancy drive control and enables the entire moving platform to produce buoyancy or gravity through adding pressure to and relieving pressure from the oil sac. Specifically, the mobile sealed compartment is connected with an outer oil sac which is connected with an inner oil sac via a solenoid valve and an oil pump is pressurized by an electronic circuit controlled air pump in the compartment to discharge the oil from the inner oil sac to the outer oil sac so as to increase the volume of the drain water from the platform, thus increasing the buoyancy of the platform to make the platform ascend; on the contrary, when the oil returns from the outer oil sac to the inner oil sac owing to seawater pressure, the platform will descend owing to the decrease of the buoyancy of the entire platform. Although this type of instrument can easily control, through its circuit, the slight buoyancy of the platform and change the buoyancy without additional electric power consumption during platform motion, it has the following challenges:
  1. The mechanical control part in the compartment is complex and requires a precision air pump, oil pump, solenoid valve and accurate measurements with related sensors; moreover, this type of instrument requires many batteries and the system is complex and bulky.
  2. All power is sourced from batteries which have a huge influence on the gravity of the sealed compartment, the design of compartment body is closely related to the quantity of batteries, their service life directly determines the overall design, that is, the battery may affect the whole instrument;
  3. This type of instrument, with limited working water depth, is mostly applied to the measurements for the water depth less than or within 2000 m at present, and for the water depth beneath 2000 m, the power consumption of the batteries required for pumping the oil to the outer oil sac owing to the increase of water depth cannot keep balance with the battery efficiency so that the overall design of the compartment cannot satisfy further power consumption, thus resulting in failure to complete further measurements.

The second type is an instrument that adopts a motor to drive a gear to climb along a cable. The instrument works as follows: A moving platform is seized onto the underwater cable via a roller, the platform buoyancy is set to zero, the motion of the platform along the cable is driven by the motor in the electronic compartment, the motor drives the gear to rotate, thus driving the roller outside the compartment to move up and down along the cable and the ascending and descending of the platform are controlled through controlling the rotation direction of the motor. The instrument has the advantages including simple mechanical design part, minor influence of the water depth and simplicity in electronics control but has several difficulties:
  1. Every step of platform motion will consume electricity, which constitutes a huge challenge to the batteries; like the first type of instrument, there are corresponding requirements on the design of the electronics compartment, the times of the working profiling determines the quantity of the batteries, thus determining the design size of the electronics compartment.
  2. The platform, with limited motion speed, requires the motor for every meter of motion in the process of ascending and descending, and huge electricity consumption is required with the increase of the platform motion speed, which also constitutes a huge challenge to the reliability of the inner motor and outer roller.

It can be seen that the power energy storage mechanism (battery and motor) and measurement mechanism are set on one platform for the above-mentioned two measurement methods so that there is a problem that the energy for controlling the platform motion is restricted by the battery, thus exerting a decisive influence on the overall design.

SUMMARY OF THE DISCLOSURE

Based on the technical problem, the disclosure provides a new method for along-the-cable underwater profile measurement, wherein, a power energy storage mechanism (weight) is separated from a measurement platform, the energy storage mechanism provides power through potential mechanical energy (weight) in lieu of batteries and the measurement platform can control the ascending and descending of the platform just with the power energy (one weight) required for one profile measurement being carried, thus fundamentally solving the most difficult power problem of the moving platform.

The technical solution adopted by the disclosure is:

A type of along-the-cable reciprocating motion control mechanism comprising a moving platform, weight drop-off gear, weight release gear and trigger gear. The moving platform is set at the guide cable and can make reciprocating motion along the guide cable, a profiler is carried by the moving platform and the buoyancy of the moving platform carrying the profiler is greater than zero, the weight drop-off gear is set at the top of the guide cable and can drop a weight onto the moving platform within the predefined period, the weight release gear is set on the moving platform, the trigger gear is set at the bottom of the guide cable, and when the moving platform carries a weight and descends to the bottom of the guide cable, the trigger gear touches the weight release gear to enable it to act accordingly, thus causing the weight to separate from the moving platform, and the moving platform ascends by its own buoyancy to the top of the guide cable.

Preferably, the weight drop-off gear comprises a shell with a support and electronic control unit located in it, a chamber is located on the support and stores several weights to be released, the chamber winds like a snake around the outside of the support from top to bottom, the first block piece is set at the end of the outlet of the chamber and the electronic control unit controls the opening and closing of the first block piece.

Preferably, the electronic control unit comprises a jack, electronics compartment and the first drive rod set, a lifting platform is set at the top of the jack and the electronics compartment is connected with the jack and controls the jacking action for the lifting platform, the first drive rod set comprises the first drive rod and the second drive rod, the first drive rod, with one end provided with a counter weight and the other secured to the second drive rod, is horizontally placed on the lifting platform, and the first shift fork is set at the second drive rod and connected with the first block piece.

Preferably, the weight drop-off gear comprises a fixing frame where a weight storage chamber is located, a device for controlling the projection of the weights in the weight storage chamber one by one in sequence is set at the outlet end of the weight storage chamber, the device comprises the step motor, drive and rotating blade, the step motor drives the rotating blade to rotate through the drive, one controllable weight releasing outlet is set every 90 degrees around the circumference of the rotating blade and the rotating blade is built in the outer shell where the weight inlet and weight outlet are located in such a way that the weight inlet is connected with the outlet end of the weight storage chamber and perpendicular to the weight outlet.

Preferably, a weight receiving tank is set at the top of the moving platform and a weight falling port is set at the bottom of the weight receiving tank, a weight falling passage is provided inside the moving platform, the weight falling port is connected with the inlet at the top of the weight falling passage and the second block piece is set at the outlet at the bottom of the weight falling passage and the weight release gear is set at the bottom of the moving platform and controls the opening and closing of the second block piece.

Preferably, the bottom of the weight receiving tank is an inclined plane and the weight falling port is set at the lower position of the inclined plane.

Preferably, the weight release gear comprises a jacking assembly, the second drive rod set and the second shift fork, the jacking assembly comprises the probe and connecting strip, the probe is vertically placed, its top is connected with one end of the connecting strip, the other end of the connecting strip is hinged onto the support, the second drive rod set comprises the third drive rod and the fourth drive rod, the third drive rod, with one end connected with the fourth drive rod, is located above the connecting strip, the second shift fork is located on the fourth drive rod and the second shift fork is connected with the second block piece; the trigger gear is a barrier sheet used in conjunction with the probe.

Preferably, counter weights are provided on the probe and the third drive rod.

Preferably, a cable hole is set at the shaft center of the moving platform and the guide cable longitudinally passes through the moving platform via the cable hole. Preferably, the weights are high-density balls.

Compared with the prior art, the technical advantageous effects of the present disclosure are that:

(1) The present disclosure debottlenecks the selection of batteries as power source of the along-the-cable mobile observation platform at present, takes control over the descending and ascending of the moving platform through throwing out the weight carried by the moving platform after it descends to a certain depth, thus solving a series of problems that are caused when the batteries are selected as power source.

(2) The descending speed of the moving platform in the present disclosure is controlled by changing the weight of the weights and can be adjusted in a large speed range, which generally ranges from 0.1 to 0.8 m/s; the moving platform can reach any depth in sea, the measurement range is not affected by the water depth and it is possible to obtain the profile data from the water surface to the bottom; any related marine instrument may be carried; it permits long-time continuous observation and the observation times of the sea area profile may be determined by adjusting the times of loading the weights, independent of the moving platform.

(3) In the present disclosure, the moving platform and the power drive are designed as split type and the overall structure design is simpler, wherein, the weight drop-off gear can accurately control the projection time and projection times of the weights and projection interval between adjacent weights, the weight release gear is controlled purely in a mechanical way and can timely actuate the weights to separate from the observation platform after the moving platform descends to a certain depth and the structure design is very delicate.

BRIEF DESCRIPTION OF DRAWINGS

The embodiments of the present invention are described further in conjunction with the drawings.

As shown in these figures, 1—weight drop-off gear, 101—shell, 102—support, 103—electronic control unit, 1031—jack, 1032—electronics compartment, 1033—lifting platform, 1034—the first drive rod, 1035—the second drive rod, 1036—counter weight, 1037—the first shift fork, 104—chamber, 2—moving platform, 201—cable hole, 202—weight receiving tank, 203—weight falling port, 204—weight falling passage, 205—outlet, 3—weight release gear, 301—probe, 302—connecting strip, 303—support, 304—the third drive rod, 305—the fourth drive rod, 306—the second shift fork, 307—counter weight, 4—trigger gear, 5—guide cable, 601—fixing frame, 602—weight storage chamber, 603—step motor, 604—drive, 605—rotating blade, 606—controllable weight releasing outlet, 607—outer shell, 608—weight inlet, 609—weight outlet, 6010—watertight plug, 7—floating body, 8—parallel releaser, 9—gravity anchor.

DETAILED DESCRIPTION OF THE PREFERRED EMBODIMENTS

Figure 1:
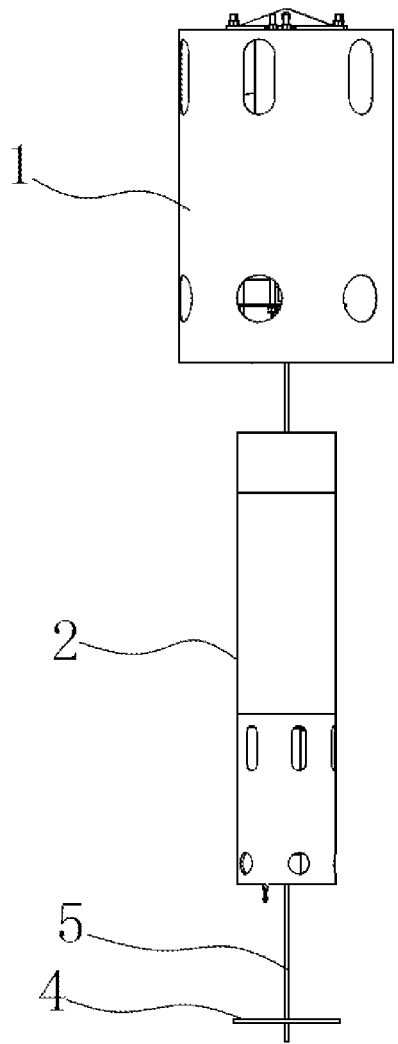
FIG. 1 illustrates an external structural sketch for an embodiment of the present invention.
Figure 2:
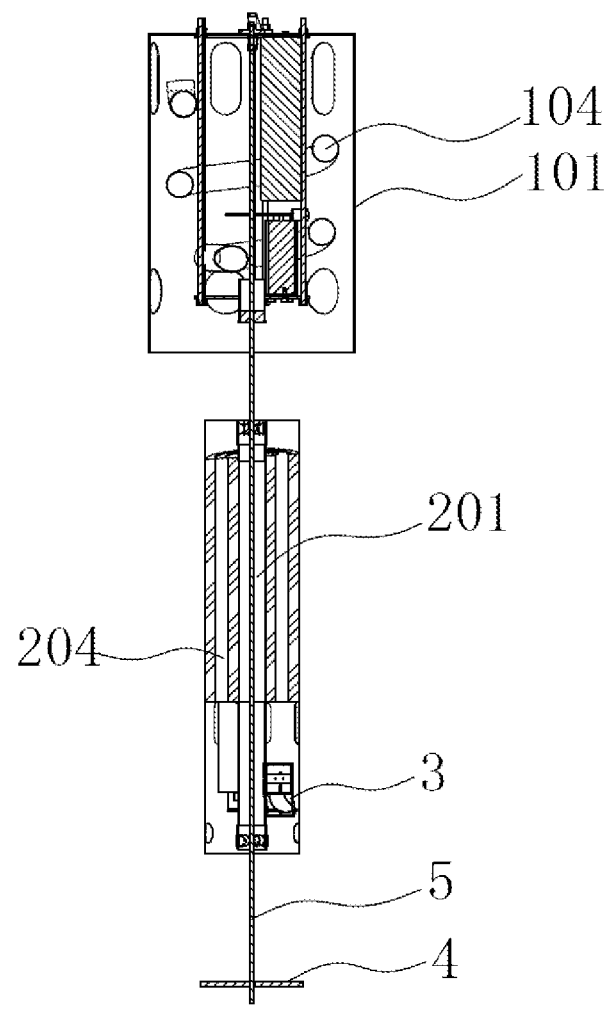
FIG. 2 illustrates a section of FIG. 1.

The present disclosure provides a type of along-the-cable reciprocating motion control mechanism, which selects mechanical mode as power source in lieu of batteries to control the ascending and descending of the moving platform, thus fundamentally solving the most difficult power problem of the moving platform. Here, the present invention is described further in conjunction with the drawings:

As shown in FIGS. 1 & 2, a type of along-the-cable reciprocating motion control mechanism comprises a weight drop-off gear 1, moving platform 2, weight release gear 3 and trigger gear 4. The moving platform 2 is set at the guide cable 5, can make reciprocating motion along the guide cable 5 and carries a profiler and the buoyancy of the moving platform carrying the profiler is greater than zero. The weight drop-off gear 1 is set at the top of the guide cable 5 and can release the weight onto the moving platform 2 within the predefined period. The weight release gear 3 is provided on the moving platform 2 and the trigger gear 4 is set at the bottom of the guide cable 5. When the moving platform 2 carries a weight, it descends owing to additional gravity, and when the moving platform descends to the bottom of the guide cable, the trigger gear 4 touches the weight release gear 3 to enable it to act accordingly, thus causing the weight to separate from the moving platform. After the weight leaves the moving platform, the moving platform ascends by its own buoyancy to the top of the guide cable 5. When the moving platform 2 returns to the top of the guide cable or when the moving platform 2 returns to the top of the guide cable and stays there for a period, another weight is released by the weight drop-off gear 1 onto the moving platform so that the moving platform repeats the reciprocating motion. The profiler on the moving platform 2 observes the profile of the sea area while the moving platform 2 is making reciprocating motion along the guide cable 5; The weight drop-off gear 1, moving platform 2, weight release gear 3 and so on involved in the along-the-cable reciprocating motion control mechanism may achieve their corresponding functions through selecting the multiple-structure mode. Here, some specific description about the preferable structure mode is only given in conjunction with the drawings but shall not be considered as restrictions on the protection scope of the present invention.

Figure 3:
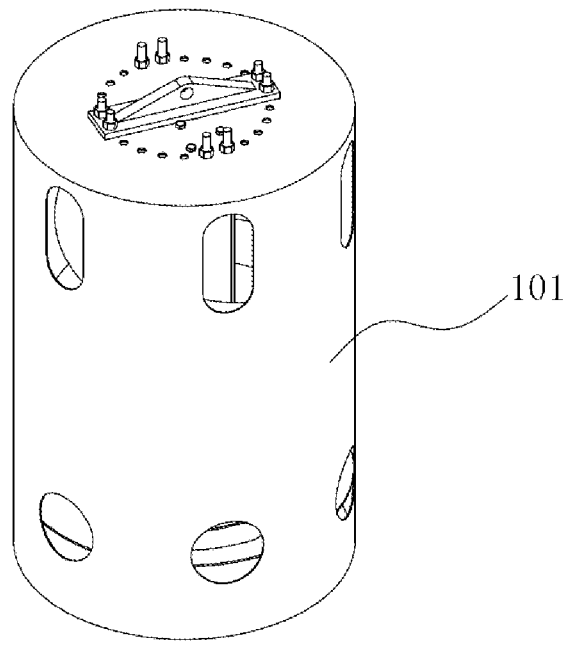
FIG. 3 illustrates an external structural sketch for the weight drop-off gear in an embodiment of the present invention.
Figure 4:
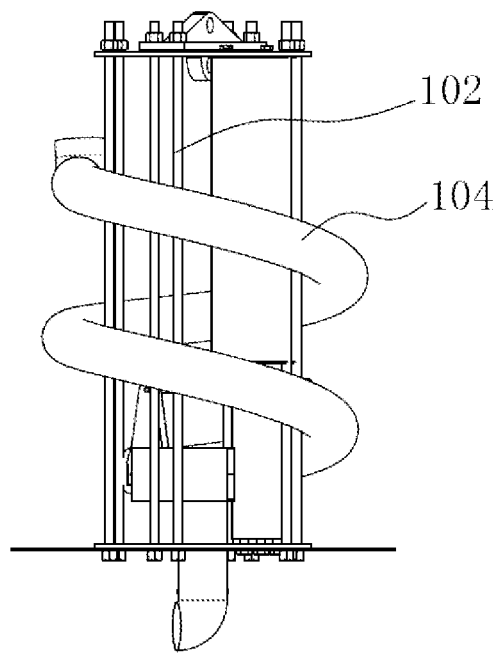
FIG. 4 illustrates a structural sketch for the weight drop-off gear without a shell in an embodiment of the present disclosure.
Figure 5:
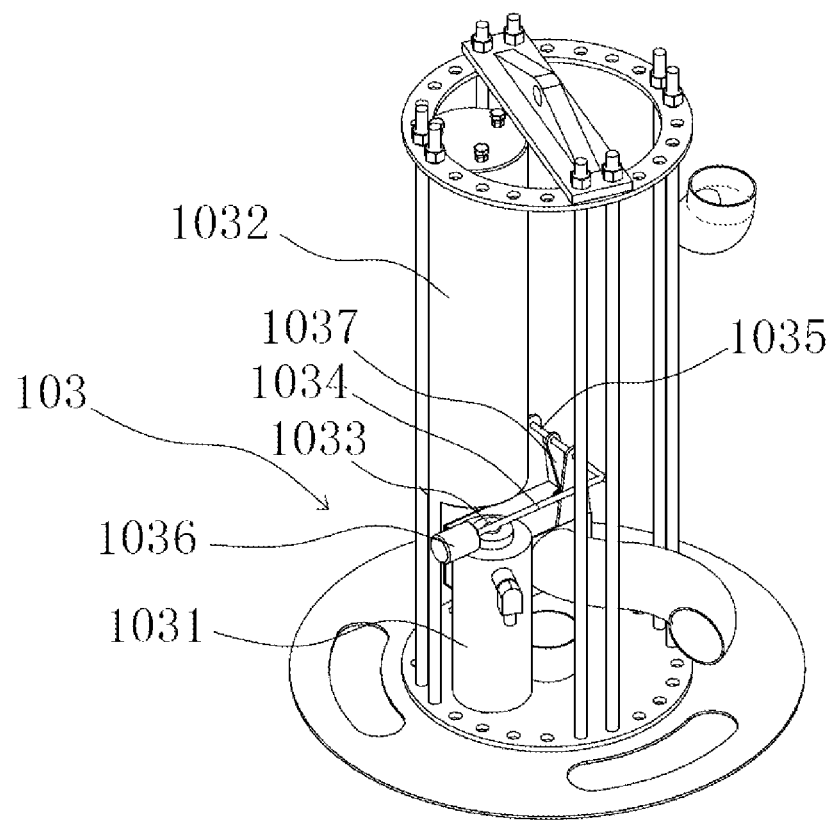
FIG. 5 illustrates a structural view for one side of the weight drop-off gear without a shell and a chamber in an embodiment of the present invention, mainly showing the electronic control unit part.
Figure 6:
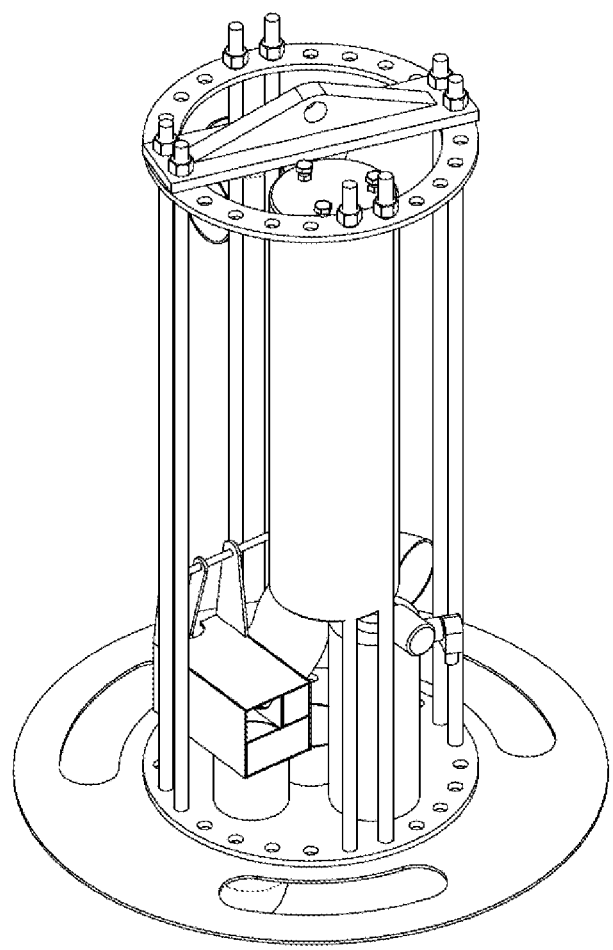
FIG. 6 illustrates a structural view for another side of the weight drop-off gear without a shell and chamber in an embodiment of the present invention.

As shown in FIGS. 3 through. 6, the weight drop-off gear 1 comprises a cylindrical shell 101 with a support 102 and electronic control unit 103 located in it. A chamber 104 is located on the support 102 and wound like a snake around the outside of the support 102 from top to bottom, and several weights to be released such as iron balls or lead balls are stored in the chamber 104. The first block piece is set at the outlet end of the chamber 104 and the electronic control unit 103 controls the opening and closing of the first block piece. When it is required to drop a weight, the electronic control unit 103 actuates the first block piece to be opened, and after the weight is projected, the electronic control unit 103 actuates the first block piece to be closed.

Furthermore, the electronic control unit 103 comprises a jack 1031, electronics compartment 1032 and the first drive rod set. A lifting platform 1033 is set at the top of the jack 1031 and the electronics compartment 1032 is electrically connected with the jack 1031 and controls the jacking action for the lifting platform 1033. The first drive rod set comprises the first drive rod 1034 and the second drive rod 1035, the first drive rod 1034, with one end provided with a counter weight 1036 and the other end secured to the second drive rod 1035, is horizontally placed on the lifting platform 1033 and the first shift fork 1037 is set at the second drive rod 1035 and connected with the first block piece.

The specific action process of the electronic control unit 103 is as follows:

When it is required to drop a weight, the electronics compartment 1032 actuates the lifting platform 1033 at the top of the jack to ascend, thus jacking up the first drive rod 1034, then the first drive rod 1034 causes the second drive rod 1035 connected with it to rotate, thus driving the first shift fork 1037 to rotate and the first shift fork 1037 drives the first block piece connected with it to be opened through movement or rotation. After the weight is projected, the lifting platform 1033 descends, the first drive rod 1034, the second drive rod 1035 and the first shift fork 1037 accordingly return to their initial positions by the gravity of the counter weight 1036 and the first block piece is closed. The projection time and projection times of the weights and projection interval between adjacent weights may be controlled by setting the electronics compartment 1032.

Figure 7:
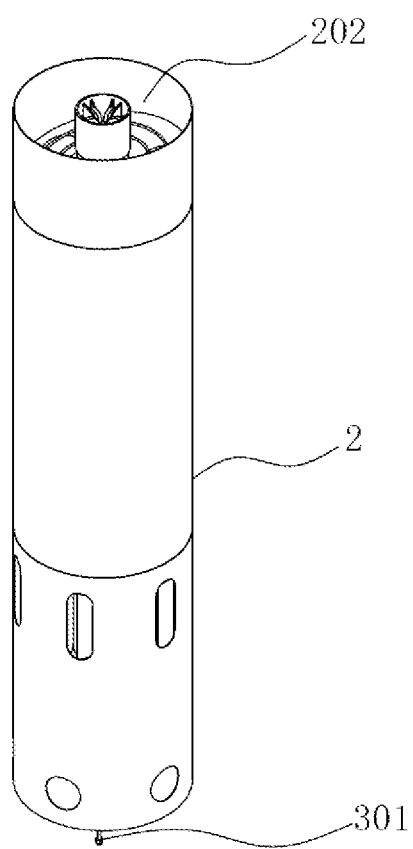
FIG. 7 illustrates an external structural sketch for the moving platform in an embodiment of the present invention.
Figure 8:
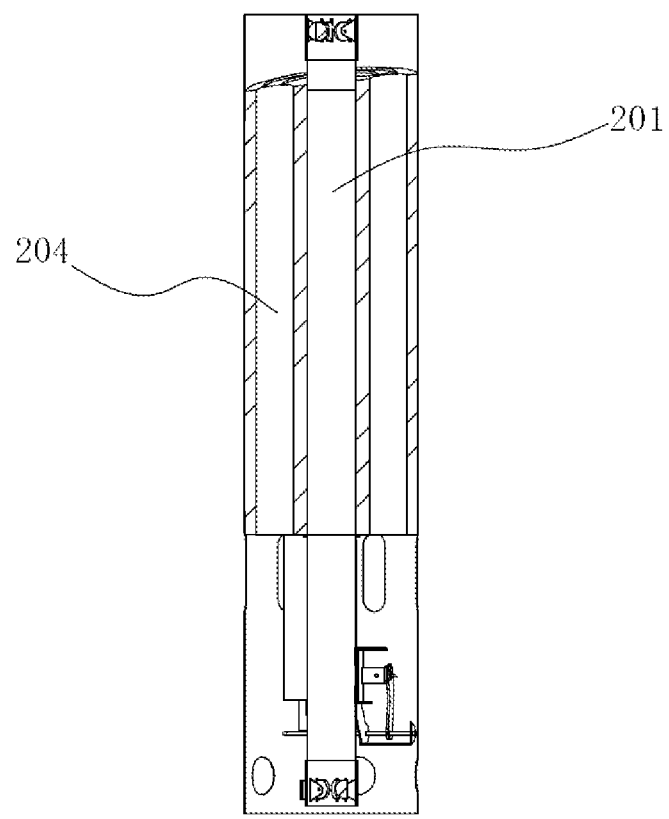
FIG. 8 illustrates a section of FIG. 7.
Figure 9:
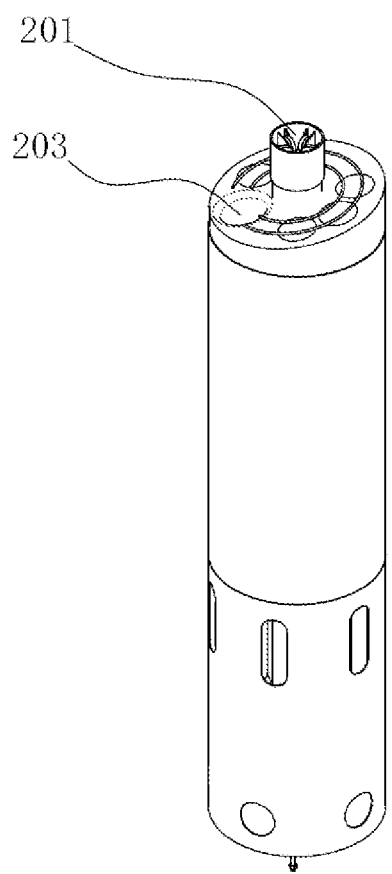
FIG. 9 illustrates a structural sketch for the moving platform without upper shell in an embodiment of the present invention, mainly showing the bottom inclined plane of the weight receiving tank.
Figure 10:
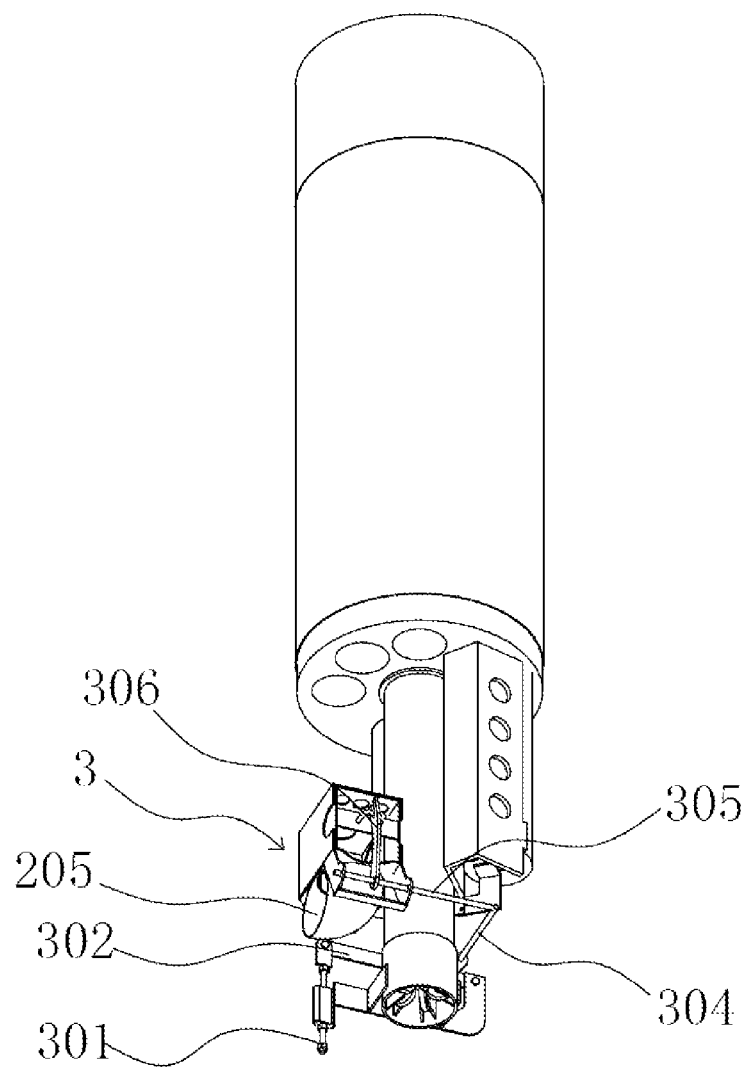
FIG. 10 illustrates a structural view for one side of the moving platform in an embodiment of the present invention, mainly showing the weight release gear part.
Figure 11:
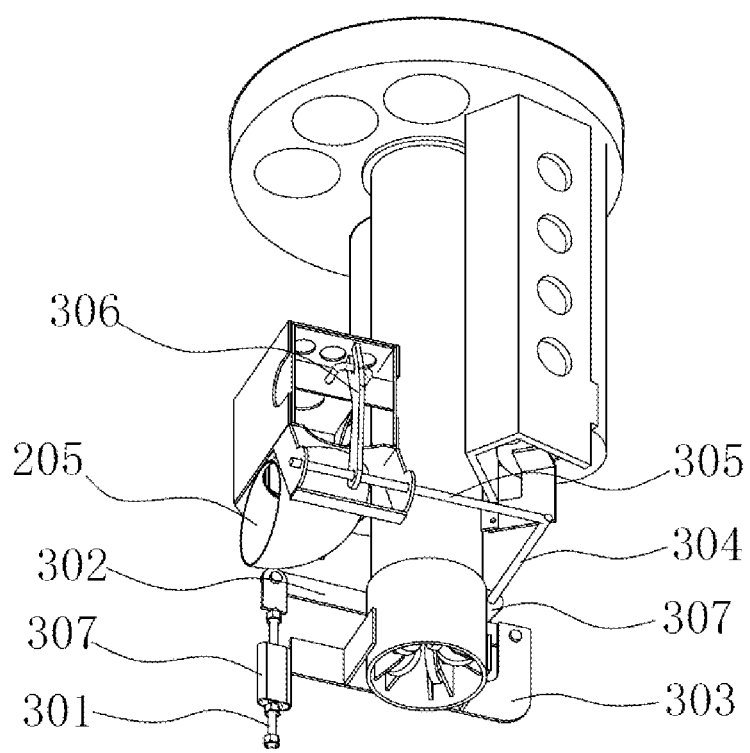
FIG. 11 illustrates a local enlarged view of FIG. 10.
Figure 12:
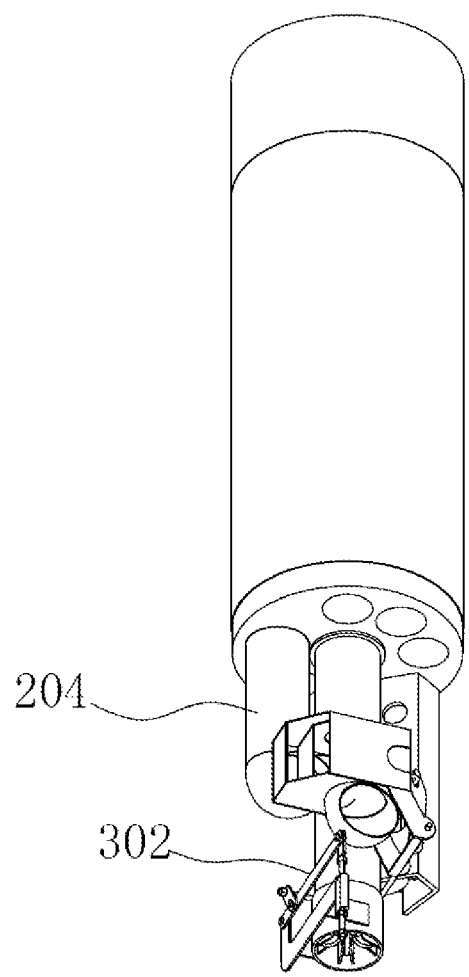
FIG. 12 illustrates a structural view for another side of the moving platform in an embodiment of the present invention.

As shown in FIGS. 7 through. 12, the moving platform 2 is cylindrical and a cable hole 201 is set at the shaft center of the moving platform 2 and the guide cable 5 longitudinally passes through the moving platform via the cable hole 201. A weight receiving tank 202, with an inclined bottom plane, is set at the top of the moving platform 2 and a weight falling port 203 is set at the lower position of the inclined plane of the weight receiving tank 202. A weight falling passage 204 is provided inside the moving platform 2, the weight falling port 203 is connected with the inlet at the top of the weight falling passage 204 and the second block piece is set at the outlet at the bottom of the weight falling passage 204. A weight projected by the weight drop-off gear 1 falls into the weight receiving tank 202, rolls to the weight falling port 203 along the inclined plane at the bottom of the weight receiving tank, runs into the weight falling passage 204 via the weight falling port 203 and moves by gravity to the outlet at the bottom along the weight falling passage 204. The weight release gear 3 is set at the bottom of the moving platform 2 and controls the opening and closing of the second block piece. Furthermore, the weight release gear 3 comprises the jacking assembly, the second drive rod set and the second shift fork 306. The jacking assembly comprises the probe 301 and connecting strip 302, the probe 301 is vertically placed, its top is connected with one end of the connecting strip 302 and the other end of the connecting strip 302 is hinged onto the support 303. The second drive rod set comprises the third drive rod 304 and the fourth drive rod 305, the third drive rod 304, with one end connected with the fourth drive rod 305, is located above the connecting strip 302, the second shift fork 306 is located on the fourth drive rod 305 and connected with the second block piece. Counter weights 307 are also provided on the probe 301 and the third drive rod 304. The trigger gear 4 is a barrier sheet used in conjunction with the probe 301.

The working process of the weight release gear 3 is as follows:

When the moving platform 2 descends to the predefined position, the bottom of the probe 301 touches the barrier sheet which applies an upward force to the probe 301 to jack it up. In the process of jacking up the probe 301, the probe 301 drives the connecting strip 302 to rotate upward, the connecting strip 302 drives one end of the third drive rod 304 above it to turn up, the third drive rod 304 drives the fourth drive rod 305 connected with it to rotate, the fourth drive rod 305 drives the second shift fork 306 to rotate and the second shift fork 306 actuates the second block piece connected with it to be opened through movement or rotation. In this case, a weight automatically drops from the outlet 205. After the weight leaves the moving platform 2, the moving platform 2 ascends by its own buoyancy along the guide cable 5. In the process of ascending of the moving platform 2, the probe 301 and the third drive rod 304 return to their initial positions by the gravity of the counter weight 307 and the second block piece is relocated at the closed position.

Figure 13:
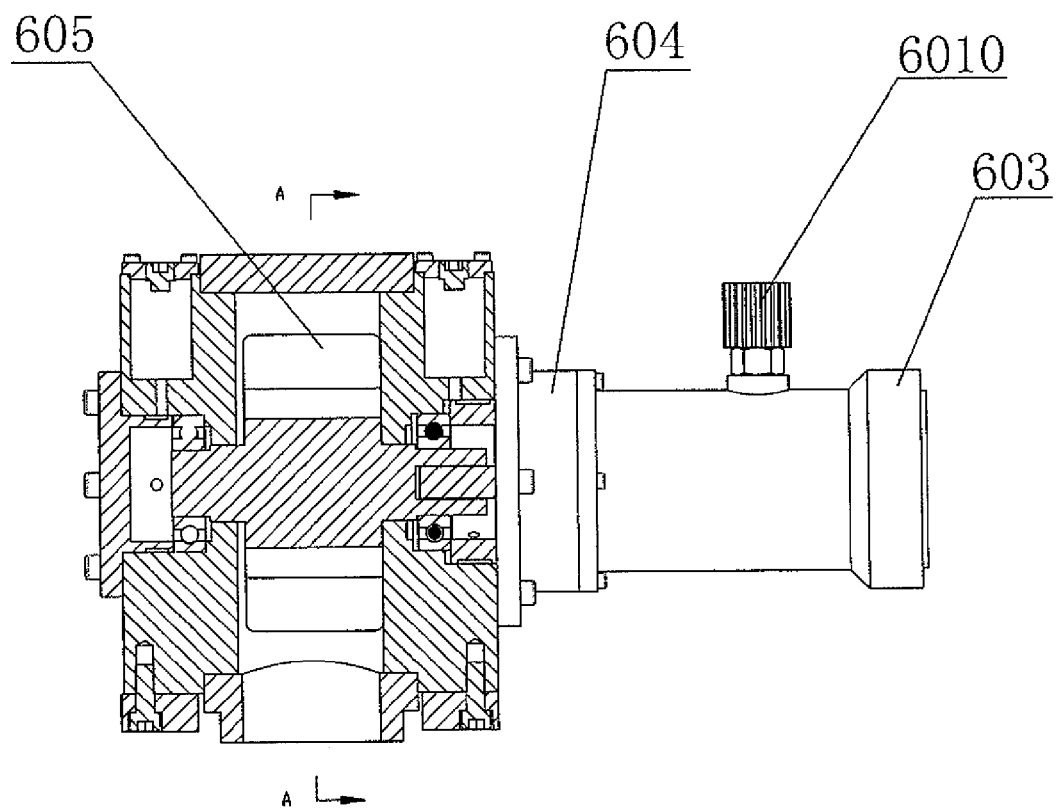
FIG. 13 illustrates a structural sketch for another achievement mode of the weight drop-off gear in an embodiment of the present invention.
Figure 14:
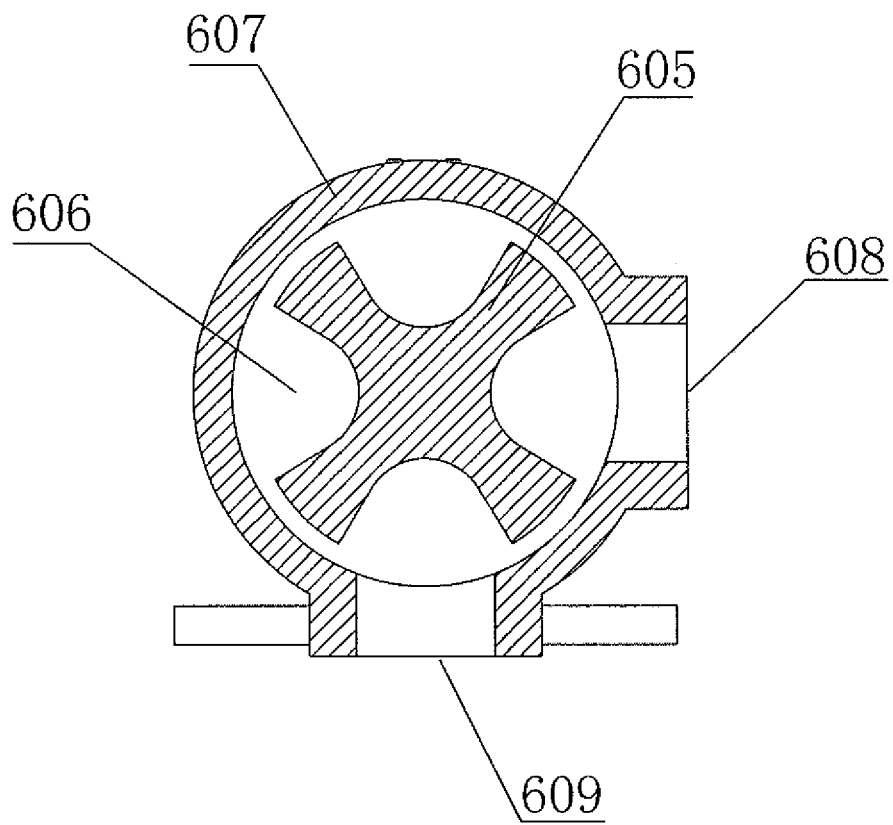
FIG. 14 illustrates View A-A of FIG. 13 and mainly shows the structure of a rotating blade.
Figure 15:
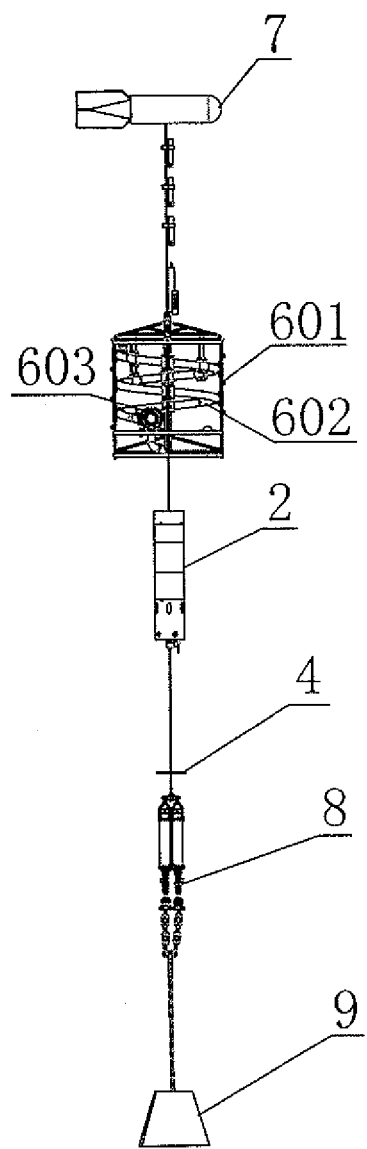
FIG. 15 illustrates the overall structural sketch of an embodiment of the present invention.

In order to improve the working stability of the weight drop-off gear 1 and ensure that it can release the weights one by one in sequence, the following structure mode may also be adopted for the weight drop-off gear 1:

As shown in FIGS. 13 through. 15, the weight drop-off gear comprises a fixing frame 601 where a weight storage chamber 602 is located and wound like a snake around the inside of the fixing frame 601 from top to bottom. A device for controlling the projection of the weights in the weight storage chamber one by one in sequence is set at the outlet end at the bottom of the weight storage chamber 602. The device comprises the step motor 603, drive 604 and rotating blade 605. The step motor 603 drives the rotating blade 605 to rotate through the drive 604 and one controllable weight releasing outlet 606 is provided every 90 degrees around the circumference of the rotating blade 605, namely, four controllable weight releasing outlets 606 are provided in total with an angle of 90 degrees between any adjacent two releasing outlets. The rotating blade 605 is built in the outer shell 607 where the weight inlet 608 and the weight outlet 609 are located in such a way that the weight inlet 608 is connected with the end of the outlet of the weight storage chamber 602 and perpendicular to the weight outlet 609.

The working process of the weight drop-off gear is as below:

The weight to be released goes into the outer shell 607 via the outlet end of the weight storage chamber 602 and the weight inlet 608 of the outer shell and is located in one of the controllable weight releasing outlets 606 of the rotating blade. To release the weight, the step motor 603 drives the rotating blade 605 to rotate by 90 degrees through the drive 604 and the weight to be released rotates to the weight outlet 609 with the rotating blade 605 and then is released by its own gravity. After the weight is released, the weight at the lowest position in the weight storage chamber 602 continues going into the outer shell 607 by gravity and held by another controllable weight releasing outlet 606 of the rotating blade and is ready for projection.

The related technical contents not mentioned in the mode can be achieved through taking or making reference to prior arts.

It shall be noted that any equivalent alternative mode or obvious variant made by the technicians of this field under the guidance of the Specification shall be included in the protection scope of the present invention.

What is claimed is:

1. An along-the-cable reciprocating motion control mechanism, the control mechanism comprising:
    a moving platform, a weight drop-off gear, a weight release gear and a trigger gear, the moving platform is attached to a guide cable and is configured to make a reciprocating motion along the guide cable,
    a profiler is carried by the moving platform and a buoyancy of the moving platform carrying the profiler is greater than zero,
    the weight drop-off gear is set at a top of the guide cable and is configured to drop a weight onto the moving platform within a predefined period,
    the weight release gear is set on the moving platform, the trigger gear is set at a bottom of the guide cable, and when the moving platform carries a weight and descends to the bottom of the guide cable, the trigger gear touches the weight release gear to enable it to act accordingly, thus causing the weight to separate from the moving platform, and the moving platform ascends by its own buoyancy to the top of the guide cable.

2. The along-the-cable reciprocating motion control mechanism according to claim 1, wherein:
    the weight drop-off gear comprises a shell with a support and an electronic control unit located in it,
    a chamber is located on the support and stores several weights to be released, an inside structure of the chamber winds like a snake around an outside of the support from top to bottom, one block piece is set at an end of the outlet of the chamber and the electronic control unit controls the opening and closing of the one block piece.

3. The along-the-cable reciprocating motion control mechanism according to claim 2, wherein:
    the electronic control unit comprises a jack, an electronics compartment and a first drive rod set,
    a lifting platform is set at a top of the jack and the electronics compartment is connected with the jack and controls a jacking action for the lifting platform,
    the first drive rod set comprises a first drive rod and a second drive rod, the first drive rod, with one end provided with a counter weight and an other end fixed to the second drive rod, is horizontally placed on the lifting platform, and a first shift fork is set at the second drive rod and connected with the one block piece.

4. The along-the-cable reciprocating motion control mechanism according to claim 1, wherein:
    the weight drop-off gear comprises a fixing frame where a weight storage chamber containing weights is located and wound like a snake around an inside of the fixing frame from top to bottom,
    a device for controlling the releasing of the weights in the weight storage chamber one by one in sequence is set at the outlet of the weight storage chamber, the device comprises a step motor, a drive and a rotating blade, the step motor drives the rotating blade to rotate through the drive,
    one controllable weight release outlet is provided every 90 degrees around a circumference of the rotating blade and the rotating blade is built in an outer shell where a weight inlet and a weight outlet are located in such a way that the weight inlet is connected with an outlet end of the weight storage chamber and is perpendicular to the weight outlet.

5. The along-the-cable reciprocating motion control mechanism according to claim 1,
    wherein, a weight receiving tank is set at a top of the moving platform, a weight falling port is set at a bottom of the weight receiving tank, a weight falling passage is provided inside the moving platform, a weight falling port is connected with an inlet at the top of the weight falling passage, a second block piece is set at the outlet at the bottom of the weight falling passage and the weight release gear is set at a bottom of the moving platform and controls opening and closing of the second block piece.

6. The along-the-cable reciprocating motion control mechanism according to claim 5, wherein, the bottom of the weight receiving tank is an inclined plane and the weight falling port is set at a lower position of the inclined plane.

7. The along-the-cable reciprocating motion control mechanism according to claim 5, wherein, the weight release gear comprises a jacking assembly, a second drive rod set and a second shift fork;

the jacking assembly comprises a probe and a connecting strip, the probe is vertically placed with its top connected with one end of the connecting strip, an other end of the connecting strip is hinged onto a support;

the second drive rod set comprises a third drive rod and a fourth drive rod;

the third drive rod, with one end connected with the fourth drive rod, is located above the connecting strip;

the second shift fork is located on the fourth drive rod and the second shift fork is connected with the second block piece;

the trigger gear is a barrier sheet used in conjunction with the probe.

8. The along-the-cable reciprocating motion control mechanism according to claim 7, wherein, counter weights are provided on the probe and the third drive rod.

9. The along-the-cable reciprocating motion control mechanism according to claim 5, wherein, a cable hole is designed at a shaft center of the moving platform and the guide cable longitudinally passes through the moving platform via the cable hole.

\* \* \* \* \*